Aug. 5, 1969  N. C. GITTINGER  3,459,937
SELF-CHECKING SYSTEM FOR A VEHICLE SEPARATION SYSTEM
Filed May 19, 1967  3 Sheets-Sheet 1
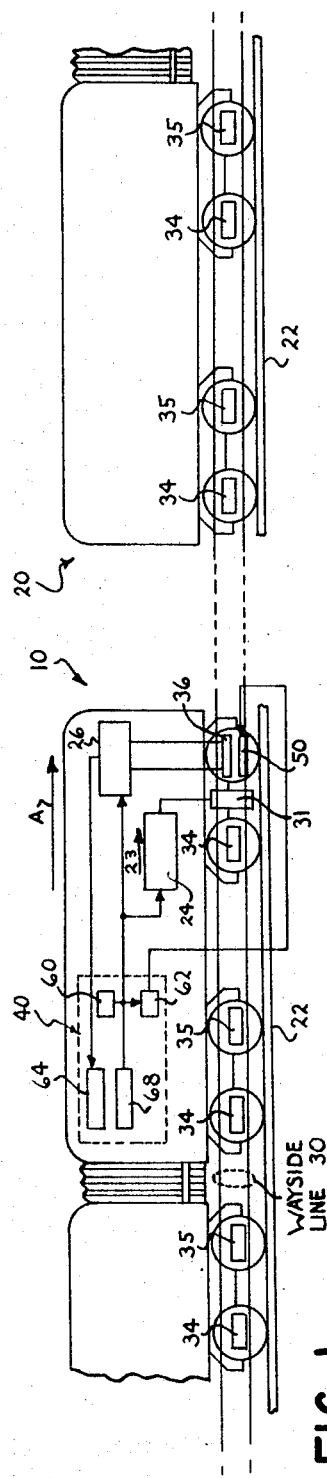
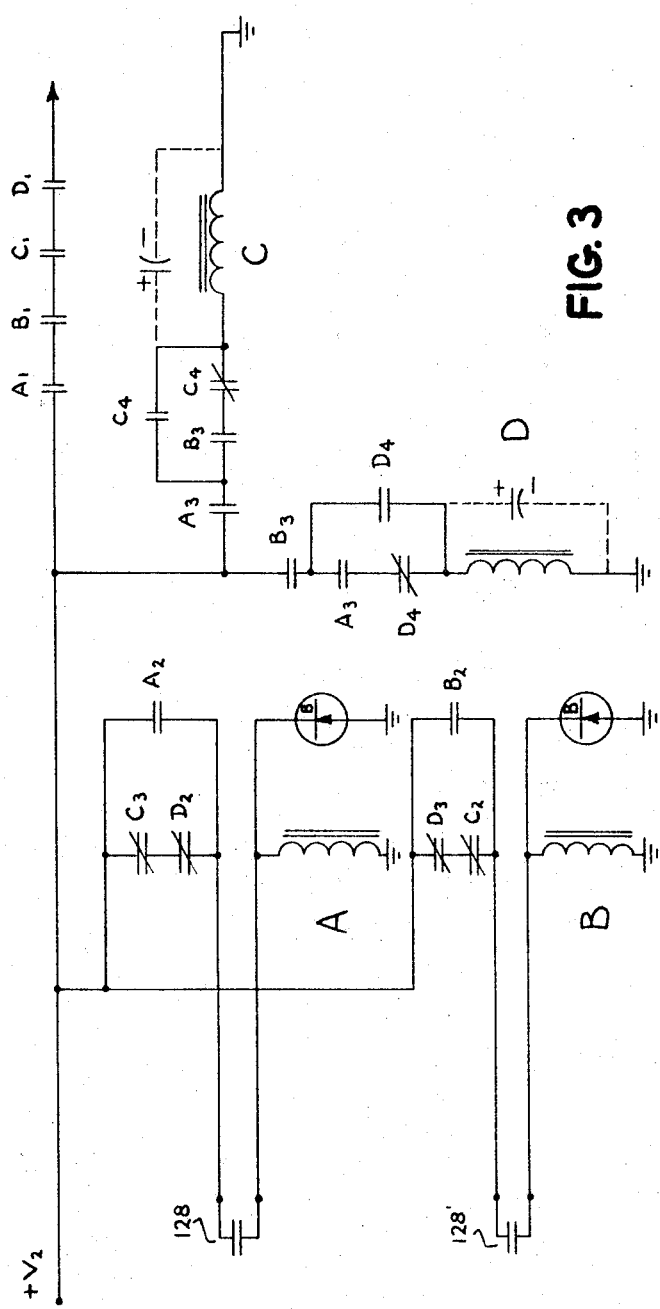
INVENTOR.
NORMAN C. GITTINGER
BY
HIS ATTORNEY

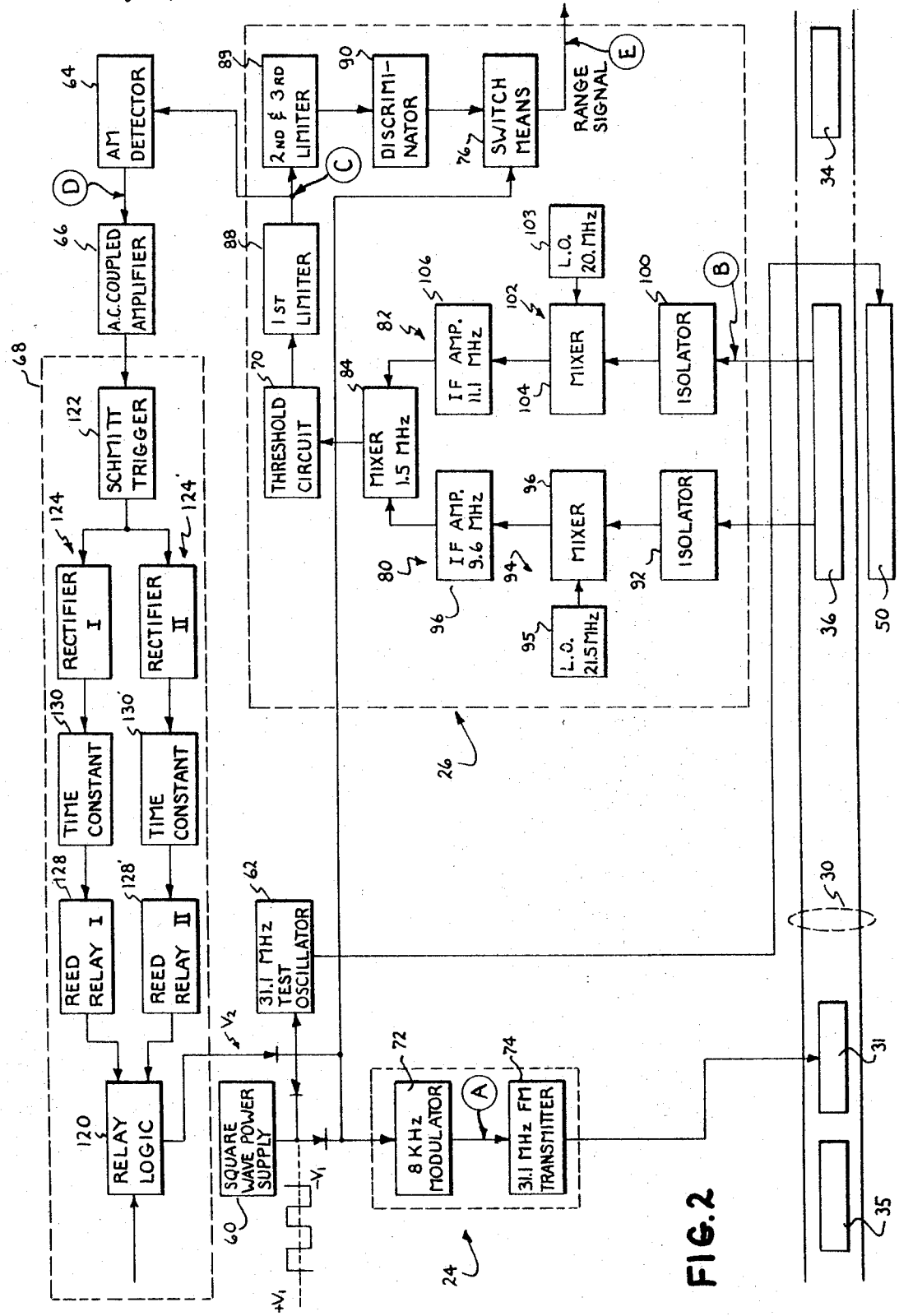

Aug. 5, 1969   N. C. GITTINGER   3,459,937
SELF-CHECKING SYSTEM FOR A VEHICLE SEPARATION SYSTEM
Filed May 19, 1967   3 Sheets-Sheet 3

United States Patent Office 3,459,937
Patented Aug. 5, 1969

3,459,937
SELF-CHECKING SYSTEM FOR A VEHICLE SEPARATION SYSTEM
Norman C. Gittinger, Schenectady, N.Y., assignor to General Electric Company, a corporation of New York
Filed May 19, 1967, Ser. No. 639,838
Int. Cl. B61l *21/00;* G01s *7/40*
U.S. Cl. 246—34                              20 Claims

ABSTRACT OF THE DISCLOSURE

A vehicle separation ranging system, employing a wayside transmission line from which transmitted and reflected energy is coupled to separate channels of a range receiver by a directional signal extracting device, has a self-checking system incorporated therewith arranged to provide for two modes of operation—a normal ranging mode and a checking mode—which occur alternately at a preselected repetition rate. During one mode, modulated carrier energy is supplied to the transmission line and during the other mode, unmodulated test carrier energy (of same frequency) is supplied to the reflected energy end of the directional signal extracting device. An amplitude modulation detector is provided in the reflected signal channel of the receiver and arranged in combination with an A-C amplifier and a logic arrangement so that in the absence of an actual reflected signal in excess of a preselected level, the transmitted energy is caused to be modulated continuously rather than alternately to create a simulated range signal.

Cross-reference to related applications

"Automatic Control Systems for Vehicles"—Allen et al. Ser. No. 418,132, filed Dec. 14, 1964, now Patent No. 3,334,224. "Receiver for Frequency Modulated, Radio-Frequency Signals"—Gittinger. Ser. No. 635,838, filed May 3, 1967.

Background of the invention

This invention relates to automatic control systems for vehicles of the type wherein the vehicle is controlled in accordance with electrical signals and wherein traffic safety is controlled in accordance with electrical signals from a ranging system, and more particularly, to a new and improved self-checking arrangement for such ranging system. The present invention is especially suited for use with a ranging system of the guided electromagnetic energy type for use with a system for automatically controlling the operation of vehicles following a fixed route, such as railway vehicles, and will be particularly described in that connection.

In railway systems, such as rapid transit systems and the like, for example, the vehicles must be operated in compliance with various local speed limits as well as in compliance with the particular traffic conditions existing in advance of the vehicle. In the existing railway signalling systems, the block system is employed and the condition of traffic in advance is indicated in terms of the particular block in which the vehicle ahead is located. While various arrangements may be employed depending upon track density and speeds, a typical block system may be arranged to indicate whether the first block in advance, the second block in advance or neither of such blocks is occupied. In such a three-level block system, for example, the block immediately behind the occupied block would be assigned the red or stop indication; the next following block, the yellow or approach with caution indication; and the third block behind the occupied block would be assigned the green or clear indication which would permit vehicle operation at maximum speed consistent with the local track speed limit. In such a system, therefore, it is apparent that the length of each block is determined by the running speeds permitted and the braking capacity of the vehicles being operated. Thus, the red block must be long enough to permit stopping from yellow speed and the yellow block must be long enough to permit vehicle retardation from the green to the yellow speed.

With the increasing demands being placed on railway systems, especially urban rapid transit systems, there has been a growing need to provide the fully automatic operation of vehicles. That is, operation of vehicles wherein no engineman or other operating personnel are required for vehicle operation and where control of both propulsion and braking is achieved in accordance with received electrical command signals from wayside. Such an automatic vehicle control system is described and claimed in the foregoing referenced application of Allen et al. entitled "Automatic Control Systems for Vehicles." As described in that application, the wayside command signals may be provided by any suitable signalling or communication system such as, for example, the existing block railway signalling systems.

It has been recognized in the art that the block system possessed certain inherent limitations which limit track capacity in railway systems, especially rapid transit systems where such factors as maximum track usage, vehicle speed, vehicle spacing, vehicle headway (time spacing) and safety are so very important. For example, in the block system, fixed block lengths are required with considerable interblock wiring and, since vehicle presence is expressed in terms of the block in which the vehicle in advance is located, uncertainty exists to an extent dependent upon the block length as to the exact distance of each vehicle in advance. Although track usage can be increased in such systems by employing more and shorter block lengths providing a higher level system, such systems become extremely expensive due to the multiplication of equipment and to the considerable interblock wiring which is required. Moreover, blocks shorter than the train length offer no advantage except at known stop points, such as stations, since the train ahead would always bridge two track sections and show occupancy in both blocks.

In view of the problems presented by the inherent limitations of the block system, attempts were made in the prior art to provide systems which would be capable of more precisely indicating the distance between the vehicle and an obstruction in advance. One such arrangement is disclosed in U.S. Patent No. 2,702,342 to Korman. An improved system of this general type is described and claimed in U.S. Patent No. 3,305,682, entitled "Ranging System." In the system of U.S. Patent No. 3,305,682, a range signal is continuously derived from transmitted and reflected wave energy in a transmission line which extends along the route of travel of the vehicle. The signal so derived increases in value as a function of increasing distance between the vehicle and a vehicle in advance thereof. Since the system of that patent is so especially suited for measuring the distance between two high-speed vehicles travelling in the same direction along the same route, the present invention will be particularly described in connection with such a ranging system. It is to be understood, however, that the self-checking arrangement of this invention may be used with the ranging system of Patent No. 2,702,342 or any other suitable ranging system employing guided electromagnetic energy.

While the inherent limitations of the block system present serious problems in the operation of any transit system, such problems become more and more intolerable in high performance automatically operated systems wherein, in order to realize the full potential thereof, vehicles must be permitted to be operated at high speed and close spacing with absolute safety. Moreover, it has been recognized that the maximum line performance requires a system of vehicle separation distance detection having a continuous output.

As indicated previously, the signal from the ranging system which provides such a continuous measurement of vehicle separation distance, increases in value as a function of increasing distance between the vehicles, and the automatic control system, with which the ranging system is incorporated, is arranged to respond to the range signal to schedule propulsion or braking tractive effort so that a safe separation distance is maintained at all times. Moreover, for "fail-safe" reasons, a range signal indicating an unsafe separation distance, for whatever reason, must cause the vehicle to be stopped.

It is possible, however, that the vehicle separation distance may be so great that, due to line attenuation for example, the reflected signal may be negligible. This condition occurs when the reflected signal level is below that of residual line reflection. Under these conditions, it is required that the range to the target on the vehicle in advance be much greater than the stopping distance of the following vehicle. It will be appreciated, therefore, that under such a condition, it is possible for the vehicle to be brought to a stop (or to remain stopped) even though the actual vehicle separation distance may be a maximum.

It is a primary object of this invention, therefore, to provide an arrangement for allowing the vehicle to proceed safely when the vehicle in advance thereof is so far away that no reflected signal is present, or if present, is of too low a strength to be operated on successfully.

It is another object of this invention to provide an arrangement for producing a simulated safe distance range signal when no reflected signal is present or, if present, is very weak, when a determination has been made that the apparatus of the ranging system is all functioning properly.

Summary of the invention

Briefly stated, in accordance with one aspect of this invention, a self-checking system is provided for a ranging system of the foregoing described type which allows the ranging system to periodically check itself and provide an artificial range signal under conditions when no reflected signal energy is present in the transmission line. The self-checking system operates by time sharing the normal ranging operation with a checking operation at a preselected rate so that, during one-half of the time sharing operating cycle, the system operates in a normal ranging mode and for a sufficiently long time to provide accurate ranging information. During the other half of the time sharing cycle, a test signal is caused to be generated and, in combination with the transmitter means, generates an artificial range signal if no reflected signal is present at the signal extracting location on the transmission line.

The novel features believed characteristic of the invention are set forth with particularity in the appended claims. The invention itself, however, together with further objects and advantages thereof, as well as its organization and method of operation can best be understood by reference to the following description taken in connection with the accompanying drawings. For convenience an clarity in describing the invention, certain specific terms and values may be used from time to time throughout the following description. These terms, however, are intended to refer only to the arrangement illustrated in the drawings, or other exemplary arrangements, and are not intended to define or limit the scope of the invention.

Brief description of the drawings

FIG. 1 is an illustration of a ranging system, of the type with which the self-checking system of this invention may be advantageously employed, for checking the system and, when the reflected signal is absent entirely or is less than a preselected level, providing a simulated range signal to allow for safe vehicle operation;

FIG. 2 is a block diagram of a ranging system incorporating the self-checking system of this invention;

FIG. 3 is a schematic diagram of the arrangement of relays and contacts thereof in the relay logic circuit;

General description of the invention

Figure 4A:
FIG. 4 shows waveforms at various points of the system of FIG. 2 for operation when a reflected signal is present.
Figure 5A:
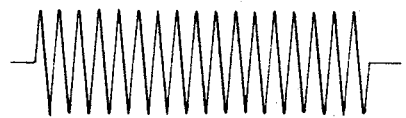
FIG. 5 shows waveforms similar to those of FIG. 4 for operation when no reflected signal is present.
Figure 4B:
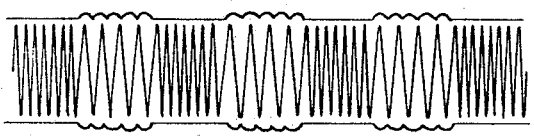
Figure 5B:
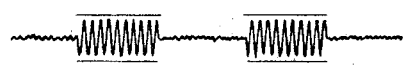
Figure 4C:
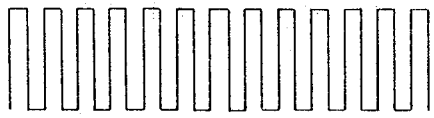
Figure 5C:
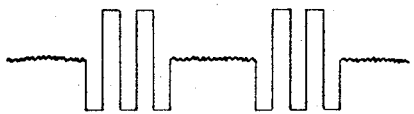

Referring now to the drawings, FIG. 1 schematically illustrates a ranging system of the guided electromagnetic energy type for use in continuously measuring the distance between two trains 10 and 20 proceeding in the same direction along the track 22. One of the cars, the lead car, of each train 10 and 20 carries a ranging system 23 including a transmitting means 24 and a receiver 26; such apparatus being illustrated for simplicity only on the lead car of train 10. Energy is coupled from the transmitter means 24 through a suitable energy coupler 31 to transmission line 30 which extends along and adjacent to the track 22. To assure propagation of the transmitted wave energy in transmission line 30 in one direction only, train 10 is provided with suitable energy reflecting and absorbing devices 34 and 35, respectively. The input means of receiver 26 is connected to a directional signal extracting means 36 which is disposed in proximity to the transmission line 30 and operates to extract a first signal from such line from the transmitted wave energy energy therein and a second signal from such line from the reflected energy therein. As shown, the advance train 20 is also provided with suitable energy reflecting and absorbing devices 34 and 35 to cause respectively the reflection of wave energy back toward the source—train 10—and prevent the transmitted energy from train 10 appearing on the line in advance of train 20. The transmitted energy is coupled from transmitting means 24 through energy coupler 31 to the transmission line 30. When this transmitted energy strikes the target, provided by the energy reflecting device 34 carried in proximity to the transmission line 30 by the advance train 20, it is reflected back toward the source so that, at the location on the line at which the directional signal extracting means 36 is disposed, a first signal may be extracted from the transmitted wave energy in the line 30 and a second signal may be extracted from the reflected wave energy in such line.

The signal extracted from the reflected wave energy in the line 30 is a delayed version of the signal extracted from the transmitted wave energy. That is, when a frequency modulated transmitter means 24 is employed, the two signals are frequency modulated, radio-frequency signals which are identical in all respects except phase. Since the transmitted energy is frequency modulated, the instantaneous frequencies of the two signals will differ by an amount which is proportional to the delay between them. Since the time delay is a function of the round-trip distance between the vehicles 10 and 20, the instantaneous frequency difference is, therefore, an indication of the vehicle separation distance.

Preferably, the new and improved range receiver described in the foregoing referenced application, Ser. No. 635,838 is employed to detect the instantaneous frequency difference between the two frequency modulated, radio-frequency signals and provide at its output an A-C signal whose amplitude is proportional to the vehicle separation distance. In the receiver described in that application, one of the signals extracted from the transmission line is converted to a convenient intermediate frequency (IF)

signal and the other signal extracted from the line is converted to a different IF signal. The two IF signals are arranged to differ from each other by a predetermined amount, for example, 1.5 mHz. These two IF signals are then multiplied together to obtain a resultant signal. This resultant signal is a difference frequency which, when suitably demodulated, provides an A-C output signal whose amplitude is a direct measure of the time delay difference between the two extracted signals. Since the time delay difference between the two extracted signals is a function of the distance between the two vehicles, the amplitude of the signal from the demodulator is also a direct measure of this distance.

Due to line attenuation, for example, it is possible that, when the vehicles are a very great distance apart, any reflected signal may be of such a low strength that it cannot be operated on successfully. This occurs when the reflected signal level falls below that of residual line reflection. For fail-safe reasons, it is expected (and required) that under these conditions, the range to the target on the vehicle in advance will be much greater than the safe stopping distance of the following vehicle. When this condition prevails, it is desirable to have assurance that the vehicle separation ranging system is actually "looking" for a target and has not failed at some point. Only when this assurance has been obtained, is it safe to allow the vehicle to proceed. If such assurance is not obtained, the vehicle must be made to stop.

In accordance with this invention, there is provided a self-checking system for the foregoing described ranging system to check for its proper operation in the event no target is "visible" and to provide for a simulated range signal to allow the vehicle to proceed. Briefly, the system, designated generally at 40, provides for the injection of a test signal into the range receiver 26 through a suitable test energy coupling means 50 for self-checking purposes and utilizes the fact that the directional signal extracting means 36 cannot distinguish the source from which it is receiving energy. Thus, if directional signal extracting means 36 picks up a proper test signal from test energy coupling means 50, it would also pick up a reflected signal (of proper level) from transmission line 30 if any such reflected signal were present.

Description of preferred embodiments (FIG. 2)

An embodiment of the present invention is illustrated in more detail in FIG. 2, which is a block diagram of a ranging system incorporating the invention. Different blocks included in FIG. 2 may not be part of the present invention, but have been illustrated to facilitate a more complete understanding of the invention in its operating environment. For example, in FIG. 2 there is illustrated the basic ranging system itself of the type described in U.S. Patent No. 3,305,682, which includes a frequency modulated transmitter 24, transmission line 30, energy coupling means 31, directional signal extracting means 36 and range receiver 26 together with the required energy reflecting and absorbing means 34 and 35. In addition, the blocks which are included in the self-checking system 40 for such ranging system and their operative association therewith are likewise illustrated in FIG. 2. Also, the range receiver enclosed within the dash-lined box 26 is of the type described in the foregoing referenced patent application Ser. No. 635,838.

As shown in FIG. 2, the self-checking system 40 is operatively associated with the ranging system so that two modes of operation are provided, a normal ranging mode and a checking mode, which occur alternately at a selected repetition rate. The self-checking system includes a power supply 60, a test oscillator 62, an amplitude modulation (AM) detector 64, an A-C coupled amplifier 66 and a logic network, generally designated at 68. In addition, a threshold circuit 70 is preferably included in the receiver means 26 for reasons which will become more evident hereinafter. Preferably, a suitable switch means 76 is provided to prevent spurious outputs from the ranging system during the checking portion of the operating cycle.

The dual mode of operation is provided by the power supply 60, which is preferably a square wave supply of a selected frequency, such as 20–50 Hz. for example. Power supply 60 is arranged so that during, for example, the positive half-cycle of operation, power is supplied to the modulator 72, which modulates the carrier frequency energy of the high frequency stable oscillator 74 of transmitter 24, and also switches "on" a switch means 76 associated with the output of the demodulator of range receiver 26 to allow the ranging system to assume its normal ranging mode of operation. During the negative half-cycle, the modulator 72 is deenergized and the switch means 76 is turned "off" while at the same time, test oscillator 62 is energized. The oscillator 62 is a high frequency, stable oscillator whose output frequency is approximately the same as that of the carrier frequency oscillator 74 of transmitter 24. The energy from test oscillator 62 is fed to test energy coupling means 50 which is arranged to be equally coupled to the transmission line 30 and the directional signal extracting means 36. Conveniently, test energy coupling means 50 may be mounted adjacent to and parallel with directional signal extracting means 36 and at a distance therefrom such that the coupling factor between the test energy coupling means 50 and the signal extracting means 36 is the same as the coupling factor between the signal extracting means 36 and the transmission line 30. The test energy coupling means 50, which may be, for example, a short section of suitably terminated transmission line, functions to couple the output of test oscillator 62 into the reflected energy end of the directional signal extracting means 36 in exactly the same manner as a true reflected signal.

Thus, a test signal, in the form of an unmodulated carrier, is injected into the reflected signal channel of range receiver 26. This test signal is added to any reflected signal extracted from the transmission line 30 by the directional signal extracting means 36. Because of the directionality of the foregoing described arrangement, no test signal is added to the transmitted signal channel of receiver 26. Thus, the transmitted signal channel of the range receiver receives only the frequency modulated energy through transmission line 30 while the reflected signal channel thereof receives the reflected frequency modulated energy (if any) plus the unmodulated test signal. The two signals are processed through the two separate signal channels 80 and 82 of the range receiver 26. For example, range receiver 26 includes two separate signal channels, a transmitted signal channel 80 and a reflected signal channel 82. Channel 80 is operative to convert the extracted transmitted frequency modulated, radio-frequency signal to a first IF signal while channel 82 operates in a similar manner to convert the extracted reflected frequency modulated, radio-frequency signal to a different IF signal. The two IF signals from the channels 80 and 82 are then multiplied in a suitable mixer circuit 84 to provide a difference frequency signal which is suitably demodulated in demodulator means 86, shown as including a limiter stages 88 and 89 and a discriminator 90.

More specifically, each of the channels 80 and 82 includes a signal isolator, a converter and an IF amplifier. Thus, channel 80 includes a signal isolator 92, a converter 94 including a local oscillator 95 and a mixer circuit 96, and an IF amplifier 98. Similarly, channel 82 includes a signal isolator 100, a converter 102 including a local oscillator 103 and a mixer circuit 104, and an IF amplifier 106. Suitable selection of the output frequency of the local oscillators 95 and 103 will assure that the IF signals produced from the transmitted and reflected signals differ from each other by a preselected amount.

For example, in the receiver illustrated, for use with a ranging system employing a carrier frequency of 31.1 mHz., frequency modulated with an 8 kHz. sine wave, the transmitted signal is converted in channel 80 to an IF signal of 9.6 mHz. and the reflected signal is converted in channel 82 to an IF signal of 11.1 mHz.; the difference frequency, therefore, being 1.5 mHz. This is accomplished by providing a local oscillator 95 having an output frequency of 21.5 mHz. and a local oscillator 103 having an output frequency of 20 mHz.

The two IF signals from channels 80 and 82 are then suitably multiplied together, such as by being applied to the mixer 84, to obtain the difference frequency. The difference frequency output has a frequency modulation frequency deviation which is proportional to a sine function of the difference in time delay of the transmitted and reflected signals. This difference frequency signal, therefore, is a normal frequency modulated signal which can be conveniently demodulated by being passed through suitable limiter stages and a discriminator. The output of the discriminator is an A-C signal whose amplitude is a direct measure of the time delay difference between the two signals extracted from the transmission line and hence is a direct measure of the distance between the trains 10 and 20.

In normal ranging operation, the signal extracted from the transmitted wave energy in the transmission line 30 is applied to the input of signal isolator 92 of transmitted signal channel 80 and thence to converter 84 where it is converted to an intermediate frequency signal of 9.6 mHz. Similarly, the signal extracted from the reflected wave energy in the transmission line is applied to the input of signal isolator 100 of reflected signal channel 82 and thence to converter 102 where it is converted to an intermediate frequency signal of 11.1 mHz.

The two different IF signals are suitably amplified and applied to mixer circuit 84, the output of which is then fed to the input of limiter stages 88–89 which repeatedly amplify and limit the signal to remove amplitude fluctuations and provide a constant level signal at its output in well known manner. The output of limiter circuit stages 89 is applied to the input of discriminator 90, which detects any frequency modulation present on the 1.5 mHz. limited signal.

During the positive half-cycle of operation of the power supply 60, the FM transmitted and reflected signals are processed through channels 80 and 82 and compared in mixer circuit 84. The resulting FM output from mixer circuit 84 is fed through a suitable threshold circuit 70 to limiter circuits 88 and 89 and discriminator 90 to provide a range signal, in the manner described previously, when a proper reflected signal is present. The threshold circuit 70, which may be for example, two diode devices in parallel back-to-back relation, determines whether or not a proper level reflected signal is present. For example, when a reflected signal is present during the positive half cycle of operation, limiters 88 and 89 are arranged to be saturated with signal. The threshold circuit 70 is operative to prevent the limiter circuit 88 from saturating until a definite threshold voltage imput is reached.

More specifically, when diode devices are used for the threshold circuit and since the diode devices have a turn on voltage of about 0.6 volt, no signal reaches first limiter circuit 88 until the peak A-C voltage of mixer circuit 84 reaches this level. Above this level (0.6 volt), the first limiter circuit 88 saturates within a small (e.g. 5 db) additional signal level in the reflected signal channel 82. Conveniently, by suitable adjustment of the gain of IF amplifiers 98 and 106, the threshold level is set at a desired level (e.g. 20 db) below that of a full reflected signal. The gain is such that the output of test oscillator 62 will just saturate the first limiter circuit 88 when full transmitted signal is present.

The input of AM detector 64 is connected to the output of the first limiter circuit 88 and is operative to detect the presence of signal. When both transmitted and reflected FM signals are present at mixer circuit 84, AM detector 64 produces a constant D-C output. If either channel 80 or 82 of the receiver fails, no D-C output is obtained from AM detector 64. On the other hand, when there is a transmitted FM signal present in transmitter signal channel 80 and an unmodulated carrier (test signal) present in reflected signal channel 82 for one-half of the switching cycle, AM detector 64 produces an A-C output. This A-C output is coupled through A-C amplifier 66 to the input of a suitable circuit means, shown as logic network 68, which is responsive only to an A-C type output from AM detector 64 and produces an output which is operative to cause modulator 72 and switch means 76 to be turned to their "on" conditions continuously. As shown, logic network 68 includes a relay logic circuit 120 having four relays A, B, C and D arranged as shown in more detail in FIG. 3 so as to lock-out unless the circuits driving such relays function properly.

For example, logic network 68 also includes a driver circuit for relay logic circuit 120, which driver circuit is in turn driven from A-C amplifier through Schmitt trigger circuit 122 which provides an "on-off" function. For fail-safe operation to be assured, two such relay driver circuits should be used. As shown, therefore, two relay driver circuits 124, and 124′ are provided, arranged in parallel relation and driven through Schmitt trigger circuit 122. Each relay driver circuit includes a rectifier (126, 126′) and a small relay (128, 128′), preferably a reed relay. Also, to allow sufficient time for operation of the relays of relay logic circuit 120 and prevent relay chatter due to residual transmission line reflections, each of the relay driver circuits includes a suitable time constant circuit (130, 130′), such as an R-C circuit. In one particular application, for example, it was found that two seconds were required to prevent such relay chatter. Since the relays A, B, C and D of relay logic circuit 120 are arranged so as to lock-out if both relay driver circuits 124 and 124′ do not perform identically, the time constants of both such circuits must be made equal.

Although, preferably, the relay driver circuits 124 and 124′ are driven through a Schmitt trigger circuit 122 as described, it will be understood that any other suitable circuit means which provides a similar "on-off" function when driven by an A-C signal may be used. Also, although the output of AM detector 64 is shown as driving a logic network 68 including a relay logic circuit 120 and parallel driver circuits therefor, it will be understood that any other suitable circuit means which produces an output only in response to an A-C type output from AM detector 64 in a fail-safe manner may be employed. For example, an amplifier-rectifier-relay system or any of the solid-state switching devices arranged to be driven only by A-C are suitable. A still wider variety of different arrangements would be suitable, of course, where fail-safe operation of the system is not of such prime concern.

As shown in FIG. 3, the relays A, B, C and D of relay logic circuit 120 are arranged so as to lock-out if the relay driver circuits 124 and 124′ do not function identically. Thus, as shown, relay A is arranged to be energized through normally closed contacts of relays C and D and the contact of reed relay 128. Similarly, relay B is arranged to be energized through normally closed contacts of relays C and D and the contact of reed relay 128′. Relays C and D are arranged to be energized through normally open contacts of relays A and B and a "make-before-break" contact of the respective relay. This make-before-break contact is shown for relay C as a normally closed and a normally open contact $C_4$ and for relay D with similar contacts $D_4$. Alternatively, if make-before-break contacts are not used, large storage capacitors, shown in phantom by dash lines, may be suitably connected across the respective operating coils of relays C and D. A breakdown diode device is shown connected in shunt with the coils of relays A and B to provide for arc suppression. Also, as shown, all four relays must be energized, so as to close contacts $A_1$, $B_1$, $C_1$ and $D_1$ connected in series with the output of logic circuit 120, before the simulated target operation can be used, as will be evident from the following description of the operation of the system, which may best be explained by reference to the waveforms shown in FIGS. 4 and 5.

Assume initially that a normal ranging operation is required. That is, there is a vehicle in advance which causes a reflected signal of proper level to be extracted from transmission line 30 by the directional signal extracting means 36.

Figure 4D:
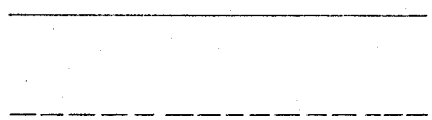
Figure 4E:
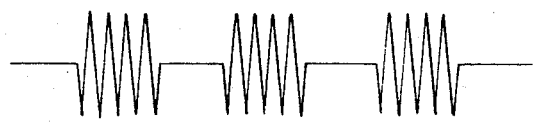

During the positive half-cycle of operation of the power supply 60, modulator 72 and switch means 76 are turned on (FIG. 4A) and test oscillator 62 is turned off. Accordingly, a frequency modulated signal is coupled to the transmission line 30 and directional signal extracting means 36 extracts a transmitted and a reflected signal (FIG. 4B) therefrom. After processing through the signal channels 80 and 82 and mixer circuit 84, a difference range signal is produced which exceeds the threshold of threshold circuit 70 and causes the first limiter circuit 88 to saturate. Since a signal is present at the output of first limiter circuit 88 (FIG. 4C), it is detected by AM detector 64 and the output of such detector is a maximum (FIG. 4D). The output of the first limiter circuit 88 is fed through limiter circuits 89 to the discriminator 90, the output of which is the range signal (FIG. 4E). The output of the discriminator is fed through switch means 76 to the vehicle control system.

During the negative half-cycle of the power supply 60, modulator 72 and switch means 76 are turned off and test oscillator 62 is turned on. Accordingly, an unmodulated carrier signal is coupled to transmission line 30 from transmitter oscillator 74 (through energy coupling means 31) and a similar unmodulated cirrier is coupled from test oscillator 62 (through test energy coupling means 50) to directional coupling means 36. Mixer circuit 84 of receiver 26 therefore receives transmitted, reflected and test signals all of which are unmodulated and produces an output which feeds through threshold circuit 70 and again saturates the first limiter circuit 88. This signal present at the output of the first limiter circuit 88 is detected by AM detector 64 to again produce a maximum output. Since switch means 76 is turned off during this negative half-cycle, the output of the discriminator is not fed to the vehicle control system.

With a reflected signal present, therefore, a normal range signal is produced and fed to the vehicle control system every half-cycle of the power supply frequency. With a power supply frequency suitably selected (20–50 Hz. for example) the fact that the range signal is applied to the vehicle control system only every half-cycle does not affect the operation since the control system is arranged so as not to follow a range signal change at this rate. Thus, the control system responds to the discriminator output signal resulting from one half-cycle of operation of the power supply (the positive half-cycle for the particular arrangement described).

Figure 5D:
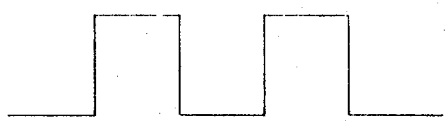
Figure 5E:
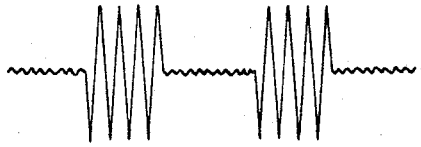

When no reflected signal is present, such as where there is no vehicle in advance or it is so far away that any reflected signal is of such a low level that it cannot be operated on, a simulated range signal is produced and fed to the vehicle traction control system. For example, when no reflected signal is present, the positive half-cycle of power supply 60 functions as previously described to turn "on" modulator 72 and switch means 76 and turn "off" test oscillator 62. Accordingly, modulated energy is coupled to transmission line 30 through energy coupling means 31. Directional signal extracting means 36 extracts a modulated transmitted signal from transmission line 30 but no reflected signal. Since the mixer circuit 84 receives only the transmitted signal from signal channel 80 and no signal from signal channel 82, it has a zero output. Thus, no signal is present at the output of first limiter circuit 88 (FIG. 5C) to be detected by AM detector 64 so that the output of such detector is also zero (FIG. 5D). It follows that, with no signal from first limiter circuit 88, the ouput of discriminator 90 is likewise zero (FIG. 5E).

On the negative half-cycle of the power supply 60, which is operative to turn "off" modulator 72 and switch means 76 and turn "on" test oscillator 62, an unmodulated signal is coupled to transmission line 30 from oscillator 74 and a similar unmodulated test signal is coupled through test energy coupler 50 from test oscillator 62 to the reflected signal end of directional signal extracting means 36. Accordingly, during this negative half-cycle of operation, mixer circuit 84 receives unmodulated transmitted and unmodulated test signals and produces an output of sufficient magnitude to be fed through threshold circuit 70 and just saturate first limiter circuit 88. The signal thus present at the output of first limiter circuit 88 (FIG. 5C) causes the output of AM detector 64 to be a maximum (FIG. 5D). The switch means 76 is, of course, turned off so that (initially) no output is fed from the discriminator 90.

From the foregoing, and with reference to FIGS. 4D and 5D, it can be seen that when a reflected signal is present in transmission line 30, the output of AM detector 64 is a steady D-C voltage (FIG. 4D), but that when no such reflected signal is present, the AM detector output is a square wave voltage (zero to maximum) (FIG. 5D) of the frequency of power supply 60 (i.e. the switching frequency). This square wave voltage is fed through A-C amplifier 66 to energize the relays in logic circuit 120 and causes the modulator 72 and switch means 76 to be turned on continuously (FIG. 5A) by appplication of a turn on voltage from relay logic circuit 120 over conductor 140. For example, the turn-on voltage $V_2$ is arranged to be sufficiently greater than $V_1$ to reverse bias the diode device in series circuit between the output of power supply 60 and the switch means (not shown) which controls the "on-off" condition of modulator 72. Under these conditions, therefore, the mixer circuit 84 receives a modulated transmitted signal from channel 80 and an unmodulated test signal from channel 82 and produces an output which is modulated the same as the transmitter. This modulation corresponds to a large range, such as two miles for example, to cause discriminator 90 to produce an output (FIG. 5E) which, since switch means 76 is now always turned on from the output of logic circuit 120, is fed to the vehicle control system to allow the vehicle to proceed.

Accordingly, with no reflected signal present, the AM detector 64 produces a zero output during the positive half-cycle of operation and maximum output during the negative half-cycle (FIG. 5D). This A-C signal is coupled through logic network 68, the output of which is operative to maintain modulator 72 and switch means 76 in the "on" condition. The logic network, therefore, operates on the change (at the switching rate) in the output of the AM detector 64. From the foregoing description, however, it is evident that this square wave output from AM detector 64 is possible only when no reflected signal is being received by range receiver 26 and when all circuits—receiver, transmitter and couplers—are working properly. A positive determination that all transmitting and receiver equipment is working properly makes it safe for a vehicle to proceed in response to the simulated range signal even though no actual reflected signal is present.

Accordingly, the system is fail-safe since all known failures of the transmission line 30 result in a signal being reflected. Also, the logic network 68 must operate from an A-C output of the AM detector 64 and full output (reflected signal present) or no output (failure) will have no effect. If any circuit ahead of the AM detector fails, including transmitter, test oscillator, or the energy coupling means, the AM detector output will be zero. If there is no transmission line, the transmitter signal will vanish and the AM detector output will be zero. Thus, when no target is present, a simulated output modulation is created. This output modulation originates at the transmitter modulator 72 and must pass through all circuits (including the transmission line) before appearing at the discriminator output as a simulated range signal. Any failure will remove this signal, causing the vehicle control system to schedule a vehicle stop. Also, since the test signal is approximately −20 db in strength from full reflected and transmitted signals, leakage of test signal into the transmitted signal channel (due to failure) cannot possibly create the A-C output from AM detector 64, since the product of test signals in both channels will be at least −40 db and not pass the threshold circuit.

To still further assure fail-safe operation, the system is arranged so that the modulator 72 and switch means 76 (positive half-cycle) and the test oscillator 62 (negative half-cycle) obtain power from the same point in the circuit rather than employing two separate supplies. The arrangement prevents a failure from resulting in an accidental simultaneous operation. For example, test oscillator 62 is arranged to operate on one polarity (negative) while the modulator 72 operates on the opposite polarity.

It will be apparent to those skilled in the art that the illustrated embodiment of the invention is an example only and that many changes and modifications may be made without departing from the invention. It is intended, therefore, in the appended claims to cover all such changes and modifications as fall within the true spirit and scope of the invention.

What I claim as new and desire to secure by Letters Patent of the United States is:

1. In a vehicle separation ranging system wherein a transmitter means, including a carrier frequency oscillator and a modulator therefor, supplies modulated electromagnetic energy to a wayside transmission line and a receiver means derives a range signal from a comparison of modulated transmitted and reflected signals extracted by the transmitted and reflected signal ends, respectively, of a directional signal extracting means, the combination with such ranging system of a self-checking system comprising:
   (a) test signal generating means for producing an unmodulated test signal at a frequency near that of said carrier frequency oscillator;
   (b) test signal coupling means for selectively coupling said test signal to the reflected signal end of said directional signal extracting means;
   (c) switching means providing an output operative to alternately cause energization of said modulator and of said test signal generating means at a preselected repetition rate so that in one switching mode modulated energy is supplied to said transmission line and in the other mode unmodulated energy is supplied thereto and a test signal is supplied to the reflected signal end of said directional signal extracting means;
   (d) signal level detecting means arranged for sensing the presence or absence of a resultant signal derived from a comparison of the signals from the transmitted and reflected ends of said directional signal extracting means and producing an output of one magnitude when said resultant signal is present, and at a different magnitude when said resultant signal is absent; and
   (e) circuit means responsive only to an A-C type output from said signal level detecting means for producing an output operative to override the output of said switching means and cause said modulator to be continuously energized so that when no reflected signal is present in said transmission line, said receiver means produces an artificial range output signal from the alternate comparison of the modulated transmitted signal and no reflected signal and the modulated transmitted signal and the test signal.

2. The self-checking system of claim 1 wherein said switching means is an A-C power supply one half-cycle of the output of which causes energization of said modulator and the other half-cycle of which causes energization of said test signal generating means.

3. The self-checking system of claim 1 wherein said signal level detecting means is an amplitude modulation detector.

4. The self-checking system of claim 2 including a switch means in the output of said receiver arranged to be actuated to its on condition by the said one half-cycle of said A-C power supply and to its off condition by the said other half-cycle thereof.

5. The self-checking system of claim 4 wherein said signal level detecting means is an amplitude modulation detector.

6. The self-checking system of claim 1 wherein said circuit means responsive only to an A-C type output from said signal level detecting means is a logic network including a relay logic circuit driven by first and second parallel arranged relay driving circuits, said relay logic circuit including a plurality of relays having contacts thereof arranged to allow an output to be produced by said logic circuit only when said first and second relay driver circuits operate in an identical manner.

7. The self-checking system of claim 6 wherein said switching means is an A-C power supply one half-cycle of the output of which is connected to cause energization of said modulator and the other half-cycle of which is connected to cause energization of said test signal generating means.

8. The self-checking system of claim 7 wherein said signal level detecting means in an amplitude modulation detector.

9. The self-checking system of claim 7 including a switch means in the output of said receiver arranged to be actuated to its on condition by the said one-half cycle of said A-C power supply and to its off condition by the said other half-cycle thereof.

10. The self-checking system of claim 9 wherein said signal level detecting means is an amplitude modulation detector.

11. The self-checking system of claim 1 wherein said test signal coupling means is mounted adjacent to said directional signal extracting means and at a distance therefrom to provide that the coupling factor between said test signal coupling means and said directional signal extracting means is equal to the coupling factor between said directional signal extracting means and said transmission line.

12. In a vehicle separation ranging system wherein a transmitter means, including a carrier frequency oscillator and modulator therefor, supplies modulated electromagnetic energy to a wayside transmission line and wherein a directional signal extracting means having transmitted and reflected signal ends, respectively, couples corresponding signals to a receiver means and wherein said receiver means includes a first channel coupled to the transmitted signal end of said directional signal extracting means, and a second channel coupled to the reflected signal end thereof, which channels are operative to convert the signals present at such ends to different IF signals which are applied to a multiplier means to produce a resultant signal for application to at least one limiter circuit stage whose output is applied to a discriminator circuit means to produce a range signal, the combination with such ranging system of a self-checking system comprising:
   (a) test signal generating means for producing an unmodulated test signal at a frequency near that of said carrier frequency oscillator;
   (b) test signal coupling means for selectively coupling said test signal to the reflected signal end of said directional signal extracting means;
   (c) switching means providing an output operative to alternately cause energization of said modulator and of said test signal generating means at a preselected repetition rate so that in one switching mode modulated energy is supplied to said transmission line and in the other mode unmodulated energy is supplied thereto and a test signal is supplied to the reflected signal end of said direction signal extracting means;

(d) signal level detecting means coupled to the output of said limiter circuit stage for sensing the presence or absence of a resultant signal derived from a comparison of the signals from the transmitted and reflected ends of said directional signal extracting means and producing an output of one magnitude when said resultant signal is present, and at a different magnitude when said resultant signal is absent; and (e) circuit means responsive only to an A-C type output from said signal level detecting means for producing an output operative to override the output of said switching means and cause said modulator to be continuously energized so that when no reflected signal is present in said transmission line, said receiver means produces an artifical range output signal from the alternate comparison of the modulated transmitted signal and no reflected signal and the modulated transmitted signal and the test signal.

13. The self-checking system of claim 12 wherein said switching means is an A-C power supply one half-cycle of which causes energization of said modulator and the other half-cycle of which causes energization of said test signal generating means.

14. The self-checking system of claim 13 including a switch means in the output of said receiver arranged to be actuated to its on condition by said one half-cycle of said A-C power supply and to its off condition by the said other half-cycle thereof.

15. The self-checking system of claim 12 including a switch means in the output of said receiver arranged to be actuated to its on condition by the output of said switching means which is operative to energize said modulator and actuated to its off condition by the output of said switching means which is operative to energize said test signal generating means.

16. The self-checking system of claim 12 wherein said circuit means responsive only to an A-C type output from said signal level detecting means is a logic network including a relay logic circuit driven by first and second parallel arranged relay driving circuits, said relay logic circuit including a plurality of relays having contacts thereof arranged to allow an output to be produced by said logic circuit only when said first and second relay driver circuits operate in an identical manner.

17. The self-checking system of claim 16 wherein said switching means is an A-C power supply one-half cycle of the output of which is connected to cause energization of said modulator and the other half-cycle of which is connected to cause energization of said test signal generating means.

18. The self-checking system of claim 17 wherein said signal level detecting means is an amplitude modulation detector.

19. The self-checking system of claim 12 wherein said modulator and said test signal generating means receive power from a common source to prevent simultaneous energization thereof.

20. The self-checking system of claim 15 wherein said test signal coupling means is mounted adjacent to said directional signal extracting means and at a distance therefrom to provide that the coupling factor between said test signal coupling means and said directional signal extracting means is equal to the coupling factor between said directional signal extracting means and said transmission line.

References Cited

UNITED STATES PATENTS 3,343,168   9/1967   Fayram.
3,388,393   6/1968   Graham et al.

ARTHUR L. LA POINT, Primary Examiner

G. LIBMAN, Assistant Examiner

U.S. Cl. X.R.

246—28; 343—17